(12) United States Patent
Engel et al.

(10) Patent No.: US 7,793,556 B2
(45) Date of Patent: Sep. 14, 2010

(54) TORQUE SENSOR FOR A STEERING WHEEL

(75) Inventors: Rainer Engel, Krefeld (DE);
Heinz-Dieter Heitzer, Heinsberg (DE)

(73) Assignee: TRW Automotive GmbH (DE)

( * ) Notice: Subject to any disclaimer, the term of this patent is extended or adjusted under 35 U.S.C. 154(b) by 13 days.

(21) Appl. No.: 12/198,144

(22) Filed: Aug. 26, 2008

(65) Prior Publication Data
US 2009/0056473 A1 Mar. 5, 2009

(30) Foreign Application Priority Data
Aug. 29, 2007 (DE) .................... 10 2007 040 857

(51) Int. Cl.
*G01L 3/00* (2006.01)
(52) U.S. Cl. .................................. 73/862.08
(58) Field of Classification Search ................................
73/862.08–862.195
See application file for complete search history.

(56) References Cited

U.S. PATENT DOCUMENTS

| | | | |
|---|---|---|---|
| 4,186,596 A | 2/1980 | Bohringer et al. | |
| 4,296,851 A * | 10/1981 | Pierce | 192/84.94 |
| 4,746,773 A * | 5/1988 | McClure et al. | 200/51.09 |
| 5,195,383 A * | 3/1993 | Tanaka et al. | 73/862.325 |
| 5,400,663 A | 3/1995 | Bridges | |
| 5,785,599 A * | 7/1998 | Reik | 464/68.41 |
| 6,123,158 A * | 9/2000 | Steffen | 173/217 |
| 6,442,812 B1 * | 9/2002 | Kovacich et al. | 29/25.35 |
| 6,799,481 B2 | 10/2004 | Nieding et al. | |
| 6,952,973 B2 * | 10/2005 | Abele et al. | 73/862.191 |
| 7,506,876 B1 * | 3/2009 | Roopnarine | 279/42 |

FOREIGN PATENT DOCUMENTS

| | | |
|---|---|---|
| DE | 27 34 182 C3 | 2/1979 |
| DE | 39 13 717 C1 | 6/1990 |
| DE | 40 38 808 A1 | 6/1991 |
| DE | 101 14 688 C1 | 3/2002 |
| GB | 1 316 049 | 5/1973 |
| GB | 2 001 767 A | 2/1979 |

* cited by examiner

*Primary Examiner*—Max Noori
(74) *Attorney, Agent, or Firm*—MacMillan, Sobanski & Todd, LLC (57) ABSTRACT

A torque sensor for a steering wheel with a center axis has an input member, an output member, the input and output members being rotatable about the common center axis, and a spring member that is arranged in a flow of force between the input member and the output member, the spring member is configured as a flat spring member extending in a plane perpendicular to the center axis.

20 Claims, 8 Drawing Sheets

TORQUE SENSOR FOR A STEERING WHEEL

CROSS REFERENCE TO RELATED APPLICATIONS

This application claims priority to German Patent Application No. 10 2007 040 857.0 filed Aug. 29, 2007, the disclosures of which are incorporated herein by reference in entirety.

BACKGROUND OF THE INVENTION

The present invention relates to a torque sensor for a steering wheel.

Torque sensors are employed in motor vehicles to detect the torque that is applied on the steering wheel and is required as an input quantity for electric steering force assist systems.

The most varied of designs of such torque sensors are known. For example, DE 27 34 182 C3 shows a torque sensor having a plurality of strain gauges which are part of a measuring hub. The measuring hub is mounted between a steering column and a steering wheel.

With the structural space available in the region of the steering wheel being limited, it is desirable for the torque sensor to take up little space.

A feature of the present invention is therefore to provide a torque sensor that requires only a small amount of space.

BRIEF SUMMARY OF THE INVENTION

According to the invention, a torque sensor for a steering wheel with a center axis has an input member, an output member, the input and output members being rotatable about the common center axis, and a spring member that is arranged in a flow of force between the input member and the output member, the spring member is configured as a flat spring member extending in a plane perpendicular to the center axis. According to the invention, the spring member is designed to be flat in the axial direction. Owing to its small overall height, the torque sensor does not protrude far into the interior of a steering wheel, as a result of which the torque sensor may be fitted to or integrated into a steering wheel without any difficulty. A flat type of construction of the steering torque sensor is necessary particularly in the case of steering wheels that are provided with air bags.

In accordance with one embodiment, a steering wheel hub is provided, the input and output members being part of the steering wheel hub, i.e. the steering wheel hub is of a two-part design. A steering column is connected to the output member, which is a first part of the steering wheel hub; and the input member, which is a second part of the steering wheel hub, is connected with a steering wheel rim. The input member could just as well be part of the steering wheel rim. If the torque sensor is integrated in the steering wheel hub, a clock spring may be used for signal transmission. The signals from operating elements of a multifunctional steering wheel are also transmitted via the clock spring.

As an alternative, the input member is part of or connected with a steering column and the output member is part of or connected with a steering wheel. This means the input and output members are mounted in the region of the steering column and may be secured to the steering column as a unit together with the steering wheel.

Preferably, a stop pin is provided which serves as an overload protection device. When a maximum angle of twist between the input member and the output member is exceeded, the stop pin connects the input and output members with each other with an interlocking fit. Any farther twisting of the input member relative to the output member is then prevented.

A ball bearing is preferably arranged between the input and output members to ensure a low-friction rotation of the input member in relation to the output member.

Provision is preferably made for a rubber buffer, so that the spring member is floatingly mounted parallel to the center axis and is uncoupled from the input and output members. Owing to the floating mounting, any deformations of the spring member as caused by the movement of the input member relative to the output member do not bring about any additional frictional moments.

The spring member may be C-shaped. The C-shaped spring member is expanded to a greater or lesser degree as a function of the steering torque and allows the input member to rotate relative to the output member. The C-shaped spring member is of advantage especially because the spring member adjusts itself by slightly shifting radially, i.e. at right angles to the center axis. This compensates, e.g., for any manufacturing tolerances of the components.

Alternatively, the spring member is essentially in the shape of a partial circle. Upon a movement of the input member relative to the output member, the spring member will deform and rest against the input or the output member. The angle of twist between the input member and the output member is thereby limited.

Preferably, the spring member comprises a first and a second end, the first end of the spring member being firmly connected with one of the input member and the output member and the second end being connected with one of the output member and the input member for limited movement. As a result, upon a rotation of the input member relative to the output member, the spring member is subjected to a uniform bending stress. The movable connection of the spring member may be effected by a ball-shaped end of the spring member.

The spring member may preferably rest against at least one of the input member and the output member. As soon as the spring member rests against the input member or the output member, the spring member can no longer be "coiled up" or "expanded". This constitutes a mechanical stop.

The spring member may include a pair of substantially meander-shaped connecting webs. The input, output and spring members are stamped or cut from a single piece. The input member and the output member are secured to the steering wheel hub or to the steering wheel and the steering column.

Other advantages of this invention will-become apparent to those skilled in the art from the following detailed description of the preferred embodiments, when read in light of the accompanying drawings.

DETAILED DESCRIPTION OF THE INVENTION

FIGS. 1 to 9 show a torque sensor according to a first embodiment for a steering wheel 8, including an input member 10 and an output member 12. Provided between the input member 10 and the output member 12 is a spring member 14 which is flat and extends in a plane perpendicular to a center axis M. The center axis M is the steering axis.

Figure 7:
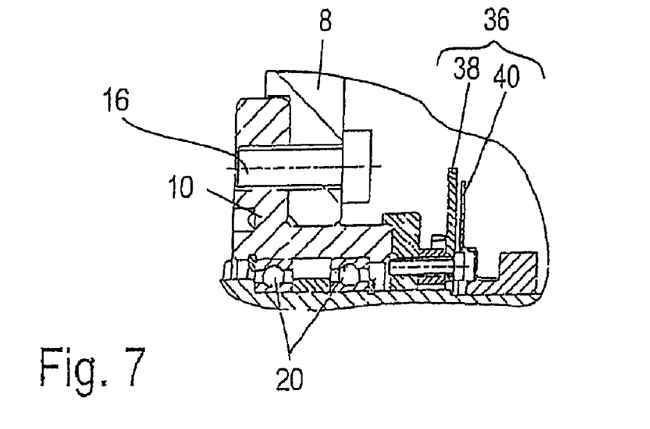
FIG. 7 shows a detail view of the connection of the input member with a steering wheel.
Figure 8:
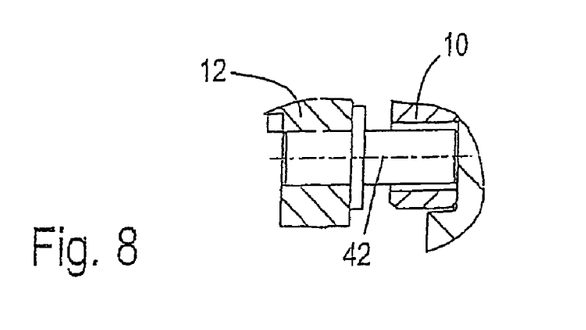
FIG. 8 shows a view of a stop pin.

The input member 10, which is rotatable about a center axis M, is bolted to the steering wheel 8, the fastening means 16 being illustrated in FIG. 7. The input member 10 is more particularly part of a steering wheel hub 17. The input member 10 could just as well be designed integrally (not shown) with the steering wheel hub 17.

The output member 12 is part of the steering wheel hub 17 and connected to a steering column 18. The output member 12, which is rotatable about the center axis M, guides the input member 10 in the axial direction.

Ball bearings 20 (FIGS. 5 and 7) are provided between the input and output members 10, 12, allowing a low-friction relative rotation of the two components.

Provision is made for a pair of pins 22, 24 (FIG. 6), the first pin 22 being connected with the input member 10 and the second pin 24 being connected with the output member 12. In addition, the two pins 22, 24 engage the spring member 14, more specifically in such a way that the spring member 14 is expanded upon a movement of the input member 10 in relation to the output member 12.

The spring member 14, which is arranged between the input and output members 10, 12, is essentially C-shaped (cf. FIG. 4) and has two spring ends 26 resting against the pins 22, 24. Diametrically opposite to the spring ends 26, the spring member 14 has a pair of noses 27 which engage a pin-shaped support 28. The support 28 is coupled to the input member 10 or to the output member 12. Ball bearings 30 for reducing friction are provided between the C-shaped spring member 14 and the input member 10, the spring member 14 and the output member 12, and between the spring member 14 and the support 28.

Figure 1:
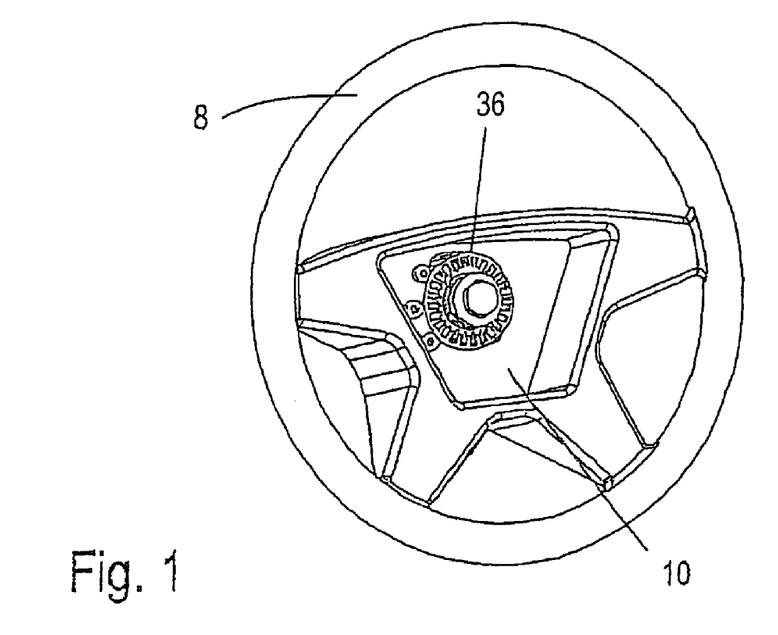
FIG. 1 shows a perspective view of a steering wheel with a torque sensor according to a first embodiment of the invention.
Figure 2:
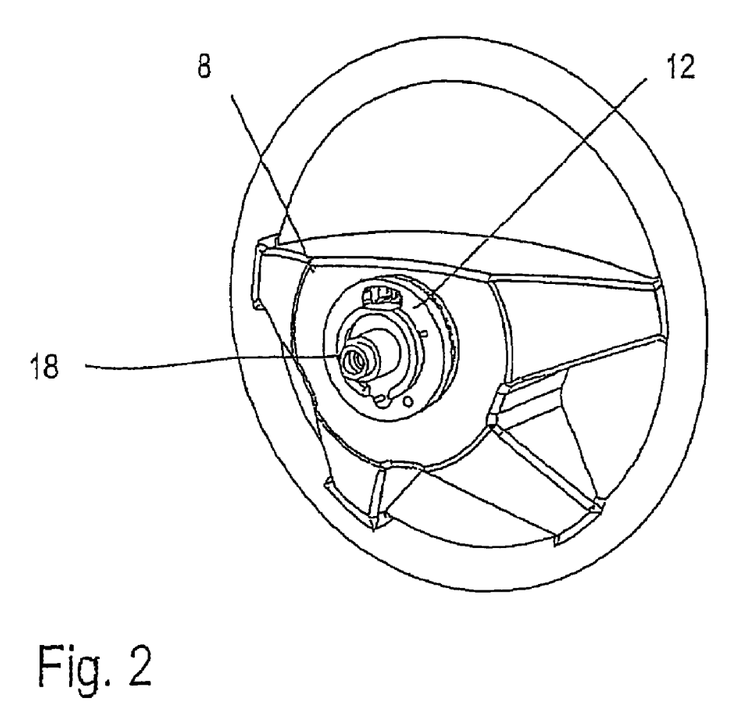
FIG. 2 shows a perspective view of the rear side of the steering wheel of FIG. 1.
Figure 3:
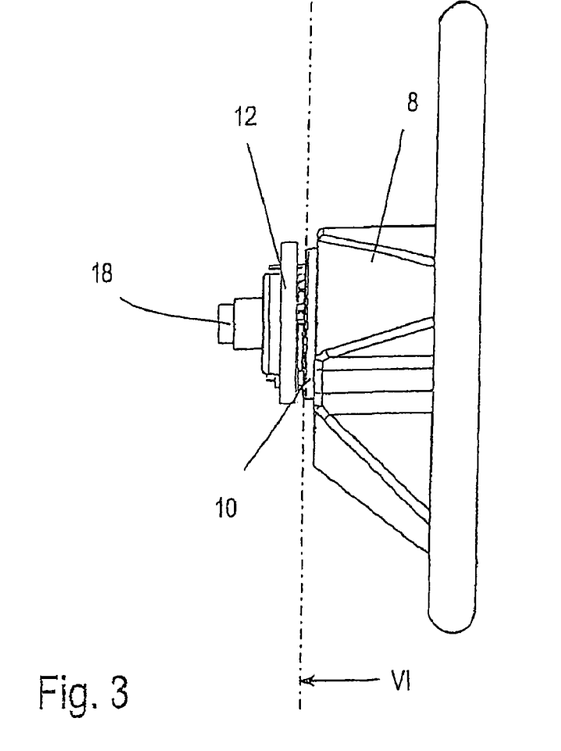
FIG. 3 shows a side view of the steering wheel of FIGS. 1 and 2.
Figure 4:
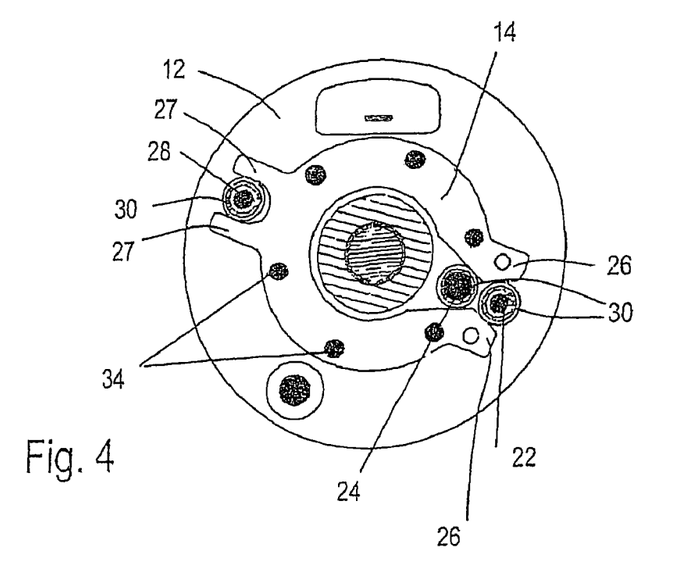
FIG. 4 shows a sectional view of the steering wheel with a spring member along the line IV-IV in FIG. 3.
Figure 5:
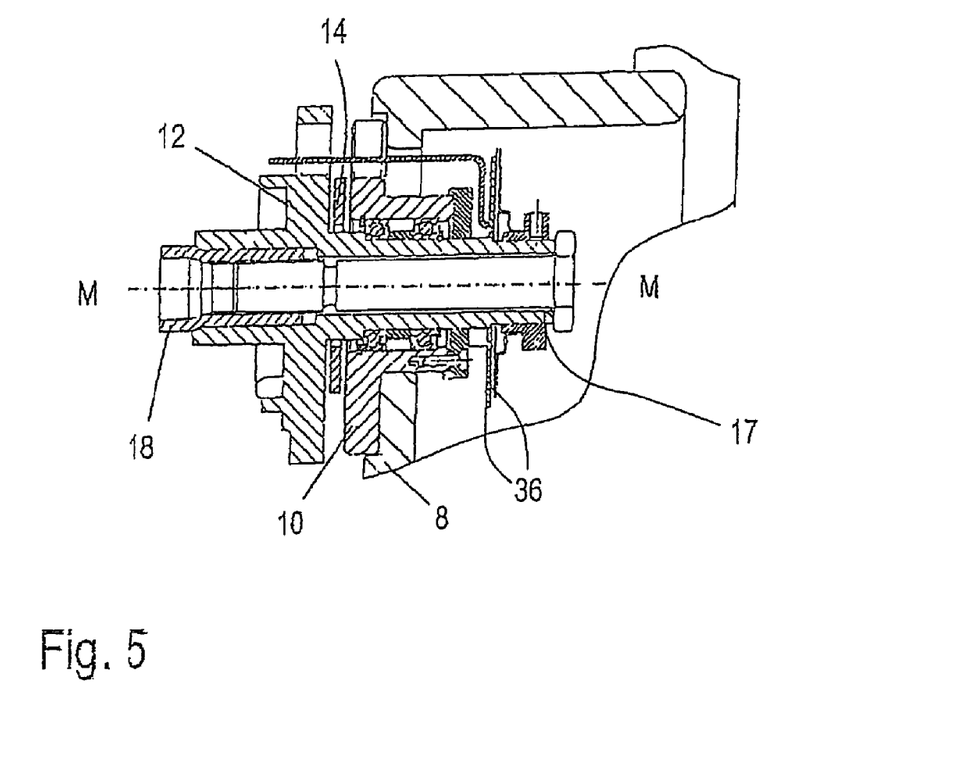
FIG. 5 shows a sectional view of the steering wheel of FIGS. 1 to 4 with an output member, an input member, and the spring member of FIG. 4.
Figure 6:
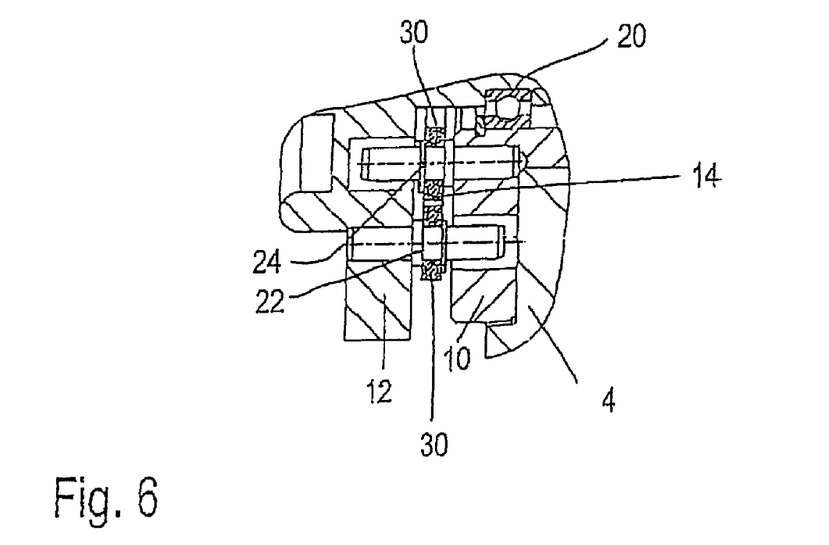
FIG. 6 shows a detail view of the connection of the input, output, and spring members of FIG. 5.

The spring member 14 urges the input and output members 10, 12 into an initial position, shown in FIG. 4, and allows a rotation of the input member 10 relative to the output member 12 proportional to the steering torque.

Figure 9:
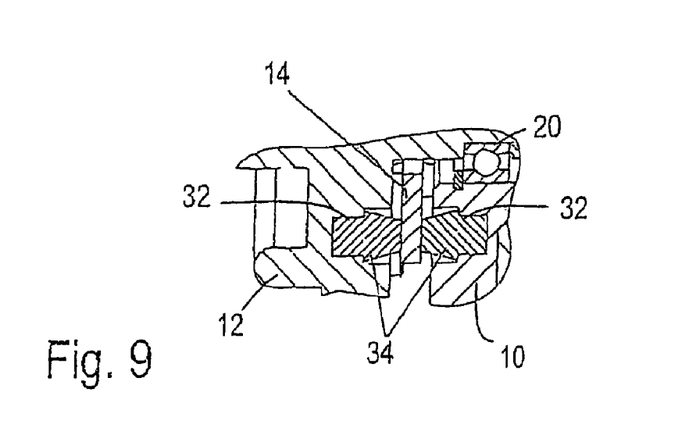
FIG. 9 shows a detail view of the mounting of the spring member.

The spring member 14 is floatingly mounted (FIGS. 4 and 9). To this end, rubber buffers 34 engaging the spring member 14 are provided in recesses 32 of the input and output members 10, 12. The rubber buffers 34 prevent an occurrence of moments of friction on the faces of the spring member 14 upon a movement of the input member 10 relative to the output member 12. FIG. 4 shows six rubber buffers 34 in a top view which are spaced apart from each other and engage the spring member 14.

A sensor 36 is provided which is made up of a disk-shaped sensor plate 38 and a star-shaped rotor 40 (see in particular FIG. 7) and is able to measure an angle of rotation between the input member 10 and the output member 12. For this purpose, the sensor plate 38 is connected to the input member 10 for joint rotation therewith, and the rotor 40 is connected to the output member 12 for joint rotation therewith.

Upon application of a steering torque, that is, upon a rotation of the input member 10 relative to the output member 12, the C-shaped spring member 14 is expanded since the first pin 22 is connected with, or is part of, the input member 10 and the second pin 24 is connected with, or is part of, the output member 12 and the two pins 22,-24 engage the spring member 14. The two pins 22, 24 engage the spring member 14 such that upon a rotation of the input member 10 relative to the output member 12, the C-shaped spring member 14 is expanded. The rotation of the input member 10 in relation to the output member 12 is measured with the aid of the sensor 36.

A stop pin 42 (cf. FIG. 8) is provided to limit the maximum turning of the input and output members 10, 12. The stop pin 42 connects the input and output members 10, 12 with each other with an interlocking fit when a maximum angle of twist of the two members 10, 12 is exceeded.

The mode of operation of the torque sensor will now be described below: When a torque applied to the steering wheel 8 is exerted on the input member 10, a rotation of the input member 10 relative to the output member 12 occurs. The C-shaped spring member 14 will expand upon a rotation of the input member 10 relative to the output member 12 since the pins 22, 24, which are connected with the input and output members 10, 12, respectively, engage the spring member 14. The sensor 36, which is made up of the sensor plate 38 and the rotor 40, detects the rotation of the input member 10 relative to the output member 12. The angle of rotation as detected is converted to a torque, the previously determined spring stiffness of the spring member 14 being taken into account. The value is then passed to an electric steering force assist system, for example.

Owing to the ball bearings 20, 30 and the rubber buffers 34, the rotation of the input member 10 relative to the output member 12 is made to involve as little friction as possible.

Figure 10:
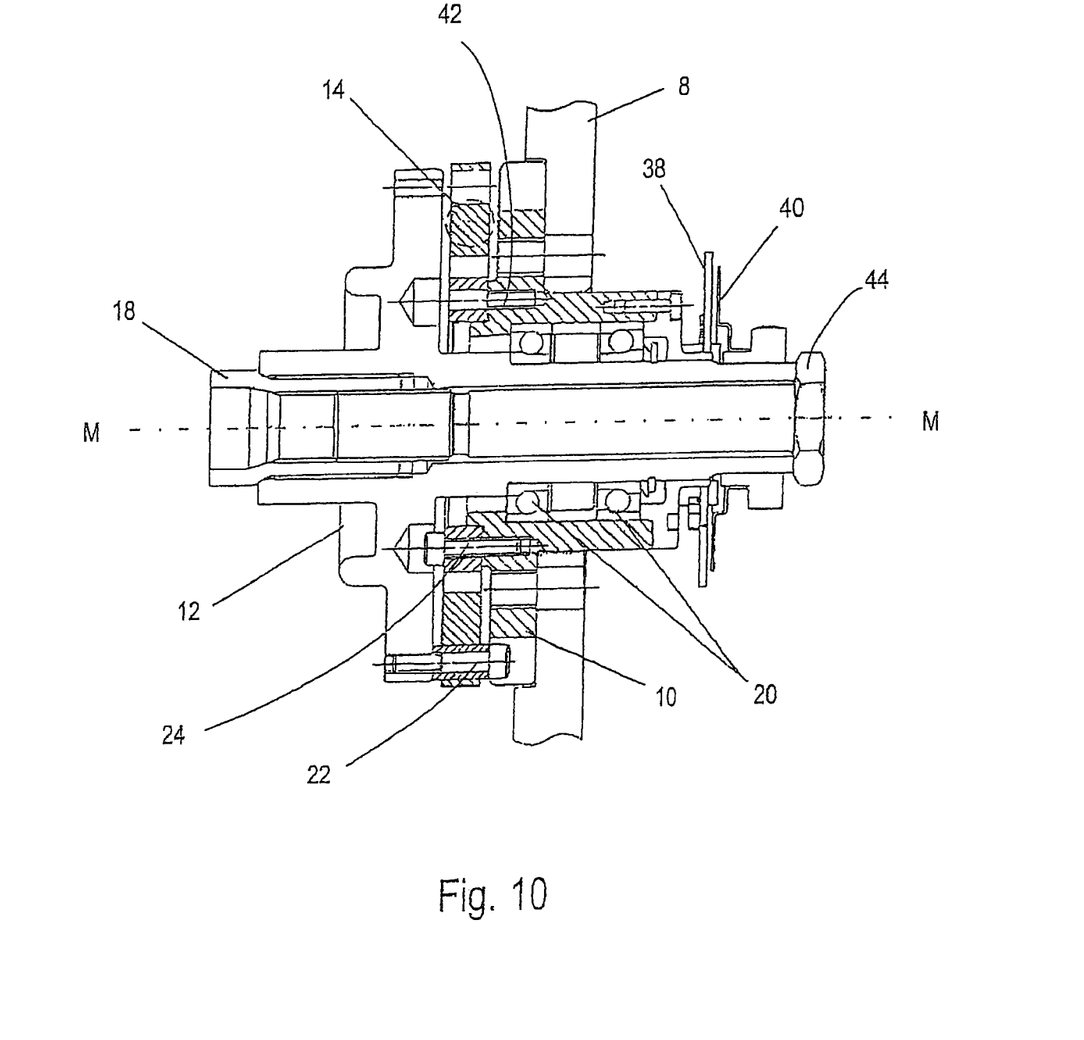
FIG. 10 shows a sectional view of a torque sensor according to a second embodiment of the invention.

The second embodiment, shown in FIG. 10, differs from the first embodiment in that the spring member 14 is arranged in the region of the steering column 18 below the steering wheel rim.

The input and output members 10, 12 are mounted to the steering wheel 8 and to the steering column 18, respectively. The input, output and spring members 10, 12, 14 may be integrated in the steering wheel 8 and secured as a preassembled unit on the steering column 18 using one single fastening screw 44.

Figure 11:
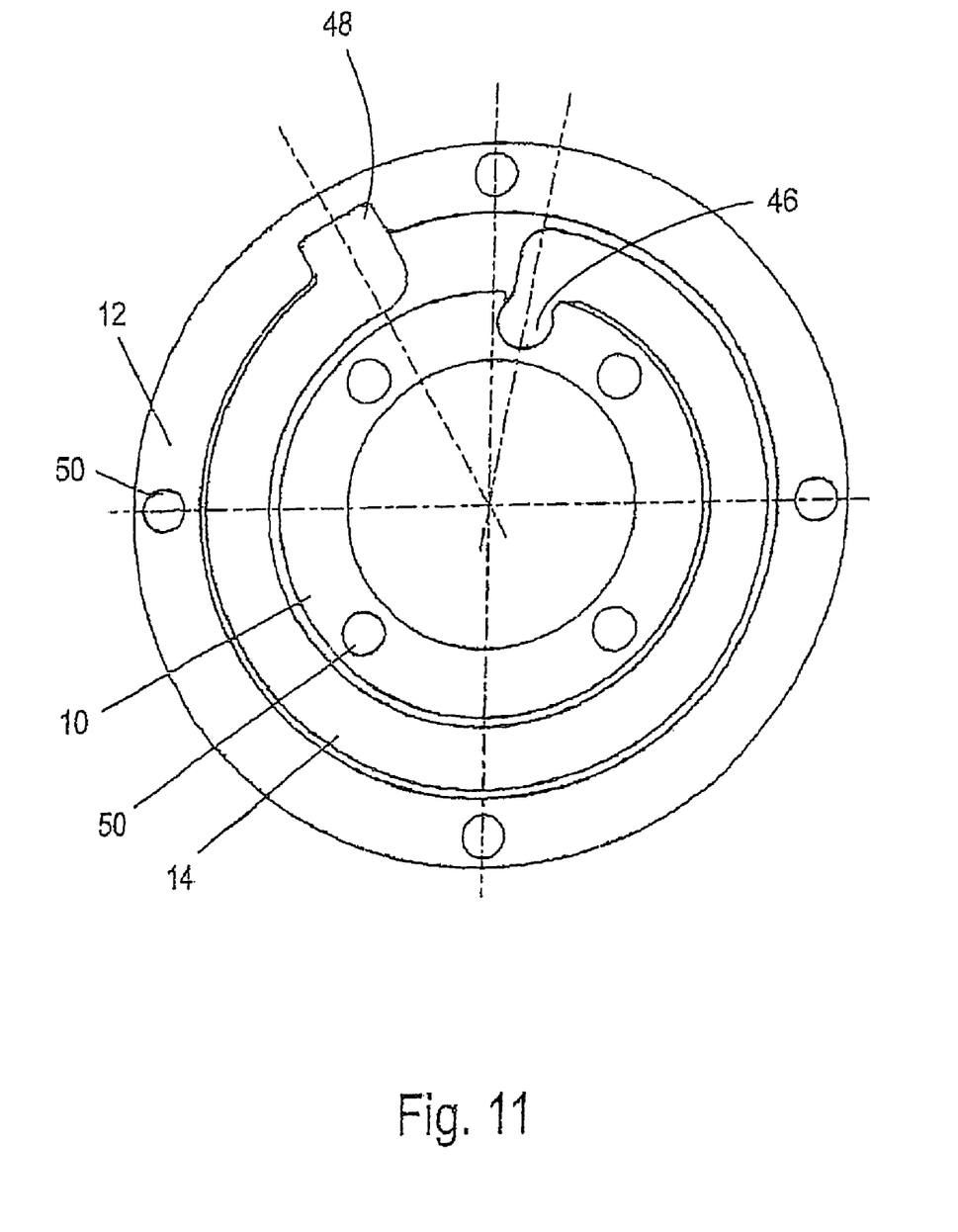
FIG. 11 shows a view of a spring member which could be inserted into the torque sensor according to the invention instead of the spring member shown in FIG. 4, in an initial position.
Figure 12:
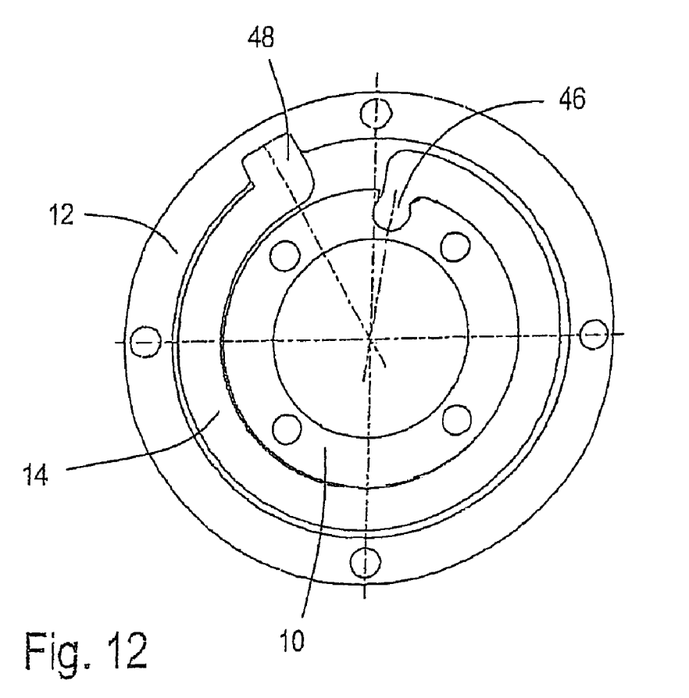
FIG. 12 shows the spring member shown in FIG. 11, in a first end position.
Figure 13:
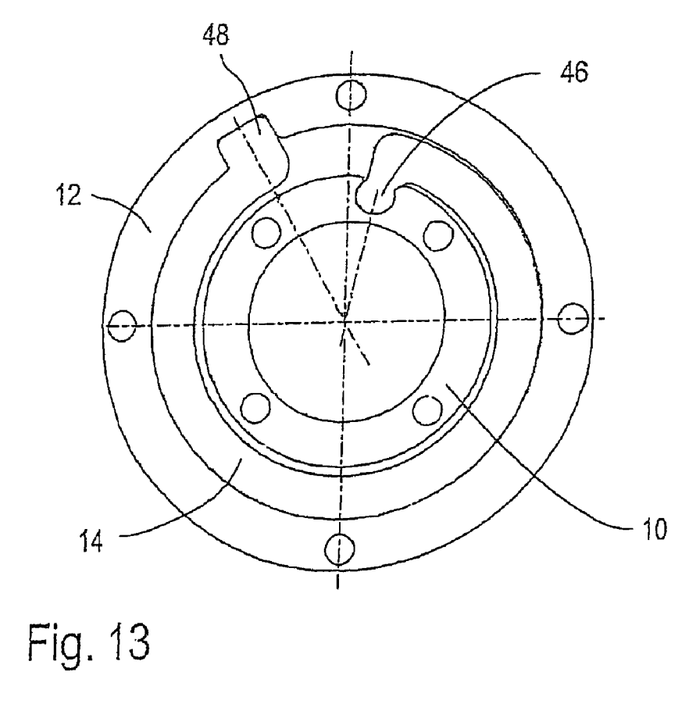
FIG. 13 shows the spring member shown in FIG. 11, in a second end position.

FIGS. 11 to 13 show a torque sensor in a further embodiment.

The spring member 14 which may be installed in place of the C-shaped spring member 14, is essentially in the shape of a partial circle and extends for about 330 degrees. The spring member 14 has a substantially constant width and thickness over its entire length. The spring characteristic of the spring member 14 may be influenced by changing the length, thickness and width thereof. A first end 46 of the spring member 14 is connected to the input member 10 for limited movement. For this purpose, it has a ball-shaped end 46 which is received in an appropriate seat of the input member 10. Since the first end 46 is connected to the input member 10 for limited movement, a uniform bending stress of the spring material is ensured. The second end 48 of the spring member 14 is firmly connected with the output member 12.

The input and output members 10, 12 are secured to the steering wheel 8 and, respectively, to the steering column 18 by means of fastening means 50 here. But the input and output members 10, 12 could just as well be designed integrally with the steering wheel 8 and the steering column 18, respectively (not shown).

When a torque applied to the steering wheel 8 is exerted on the input member 10, a rotation of the input member 10 relative to the output member 12 occurs. In the process, the spring member 14 is either "coiled up" (FIG. 12), for which reason it approaches the input member 10 until it rests against it, or else it is "expanded", for which reason it approaches the output member 12 until it rests against it. As soon as the spring member 14 rests against the input member 10 or the output member 12, the spring member 14 can not be "coiled up" or "expanded" any further. This constitutes a mechanical stop and, hence, an overload protection device.

Figure 14:
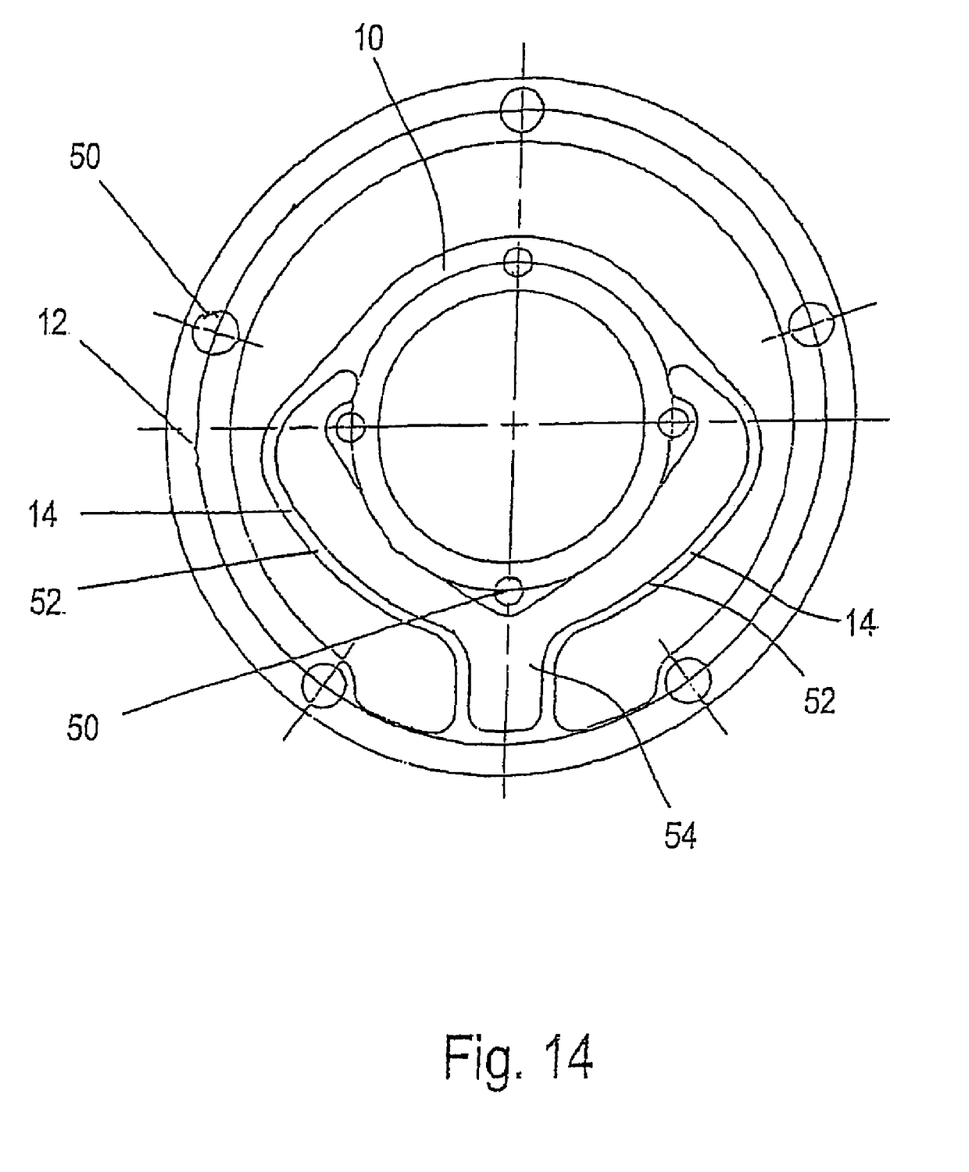
FIG. 14 shows a view of a spring member which could be inserted into the torque sensor according to the invention instead of the spring member shown in FIG. 4.

FIG. 14 shows a further spring member 14 which may be employed instead of the C-shaped spring member 14 of the first embodiment.

In this embodiment, the input and output members 10, 12 are designed in one piece, with two meander-shaped connecting webs 52 being provided which connect the input and output members 10, 12 with one another and allow a rotation of the input member 10 in relation to the output member 12 to a certain extent. The one-piece component is connected with the steering wheel 8 and the steering column 18 by means of fastening means 50. Upon a movement of the input member 10 the connecting webs 52 are bent. The connecting webs 52 constitute the spring member 14. The spring characteristic of the spring member 14 may be set by suitably selecting the shape of a recess 54 and/or the shape and width of the connecting webs 52.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention is claimed is:

1. A torque sensor for a steering wheel with a center axis, comprising:
   an input member,
   an output member,
   said input and output members being rotatable about said common center axis, and
   a spring member that is arranged in a flow of force between said input member and said output member,
   wherein said spring member is configured as a wholly flat spring member in an axial direction extending only in a plane perpendicular to said center axis.

2. The torque sensor according to claim 1, wherein a steering wheel hub is provided, said input and output members being part of said steering wheel hub.

3. The torque sensor according to claim 1, wherein a steering column is provided, said output member being part of said steering column.

4. The torque sensor according to claim 1, wherein a steering column is provided, said output member being connected with said steering column.

5. The torque sensor according to claim 1, wherein a steering wheel is provided, said input member being part of said steering wheel.

6. The torque sensor according to claim 1, wherein a steering wheel is provided, said input member being connected with said steering wheel.

7. The torque sensor according to claim 1, wherein a stop pin is provided which serves as an overload protection device.

8. The torque sensor according to claim 1, wherein a ball bearing is provided which is arranged between said input and output members.

9. The torque sensor according to claim 1, wherein rubber buffers are provided so that said spring member is floatingly mounted parallel to said center axis.

10. The torque sensor according to claim 1, wherein said spring member is C-shaped.

11. The torque sensor according to claim 10, wherein a support is provided against which said C-shaped spring member rests.

12. The torque sensor according to claim 11, wherein a ball bearing is provided which is arranged around said support.

13. The torque sensor according to claim 1, wherein said spring member is essentially in the shape of a partial circle.

14. The torque sensor according to claim 13, wherein said spring member comprises a first end and a second end, said first end being firmly connected with one of said input member and said output member and said second end being connected with one of said output member and said input member for limited movement.

15. The torque sensor according to claim 13, wherein said spring member can rest against at least one of said input member and said output member.

16. The torque sensor according to claim 1, wherein said spring member has a pair of essentially meander-shaped connecting webs.

17. A torque sensor for a steering wheel with a center axis, comprising:
   an input member,
   an output member,
   said input and output members being rotatable about said common center axis,
   a spring member that is arranged in a flow of force between said input member and said output member, and
   a sensing device for detecting an angle of rotation of said input member relative to said output member upon application of a steering torque and, based on a previously determined stiffness of said spring member, converting said angle of rotation into a value for steering torque,
   wherein said spring member is configured as a flat spring member extending in a plane perpendicular to said center axis.

18. The torque sensor according to claim 17, wherein a stop pin is provided which serves as an overload protection device.

19. The torque sensor according to claim 17, wherein a ball bearing is provided which is arranged between said input and output members.

20. The torque sensor according to claim 17, wherein rubber buffers are provided so that said spring member is floatingly mounted parallel to said center axis.

* * * * *